(12) United States Patent
Takeda et al.

(10) Patent No.: US 9,177,597 B2
(45) Date of Patent: Nov. 3, 2015

(54) DISK STORAGE APPARATUS AND METHOD FOR MANAGING STORAGE AREA

(71) Applicant: KABUSHIKI KAISHA TOSHIBA, Minato-ku, Tokyo (JP)

(72) Inventors: Shingo Takeda, Yokohama (JP); Naoaki Kawana, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 234 days.

(21) Appl. No.: 14/022,596

(22) Filed: Sep. 10, 2013

(65) Prior Publication Data

US 2015/0002957 A1   Jan. 1, 2015

(30) Foreign Application Priority Data

Jun. 28, 2013  (JP) .................................. 2013-137303

(51) Int. Cl.
*G11B 20/12* (2006.01)
*G11B 20/10* (2006.01)

(52) U.S. Cl.
CPC ............ *G11B 20/1217* (2013.01); *G11B 20/10* (2013.01)

(58) Field of Classification Search
None
See application file for complete search history.

(56) References Cited

U.S. PATENT DOCUMENTS

| | | | |
|---|---|---|---|
| 5,068,858 A | 11/1991 | Blaum et al. | |
| 5,487,077 A | 1/1996 | Hassner et al. | |
| 7,236,911 B1* | 6/2007 | Gough et al. | ................. 702/185 |
| 8,000,046 B2 | 8/2011 | Yamazaki | |
| 8,381,077 B2 | 2/2013 | Warren | |
| 2004/0257582 A1* | 12/2004 | Wang et al. | ................... 356/495 |
| 2006/0245332 A1* | 11/2006 | Shen et al. | ...................... 369/94 |

FOREIGN PATENT DOCUMENTS

JP   2002-216426   8/2002

* cited by examiner

*Primary Examiner* — Kevin Verbrugge
(74) *Attorney, Agent, or Firm* — Knobbe, Martens, Olson & Bear LLP

(57) ABSTRACT

According to one embodiment, a disk storage apparatus includes a disk having a storage area, a storage device storing management information, and a controller. The storage area includes a plurality of areas. The management information includes information indicative of a use priority or rank of each of the areas. The information indicative of the use priority or rank is set based on a quality index relating to a read operation or a write operation. The controller selects an area which is high in the use priority or rank and is usable, by referring to the management information, and executes the write operation on the selected area.

20 Claims, 4 Drawing Sheets

| | | Quality index levels | | | |
|---|---|---|---|---|---|
| | | A0 | A1 | A2 | A3 |
| Quality indices | Difference in output σ between sectors | 5 | 6 | 4 | 8 |
| | Difference in error rate | 22 | 18 | 3 | 12 |
| | Difference in flying | 12 | 9 | 2 | 5 |
| | Difference in medium defect | 2 | 1 | 2 | 6 |
| | Difference in transfer speed | 7 | 8 | 3 | 5 |
| | Area priority | 48 | 42 | 14 | 36 |

| | A0 | A1 | A2 | A3 |
|---|---|---|---|---|
| Area priority | 48 | 42 | 14 | 36 |
| Area use rank | 1 | 2 | 4 | 3 |

| | | Quality index levels | | | |
|---|---|---|---|---|---|
| | 30  31 | A0 | A1 | A2 | A3 |
| Quality indices | Difference in output σ between sectors | 5 | 6 | 4 | 8 |
| | Difference in error rate | 22 | 18 | 3 | 12 |
| | Difference in flying | 12 | 9 | 2 | 5 |
| | Difference in medium defect | 2 | 1 | 2 | 6 |
| | Difference in transfer speed | 7 | 8 | 3 | 5 |

|  |  | Quality index levels | | | |
|---|---|---|---|---|---|
|  |  | A0 | A1 | A2 | A3 |
| Quality indices | Difference in output σ between sectors | 5 | 6 | 4 | 8 |
|  | Difference in error rate | 22 | 18 | 3 | 12 |
|  | Difference in flying | 12 | 9 | 2 | 5 |
|  | Difference in medium defect | 2 | 1 | 2 | 6 |
|  | Difference in transfer speed | 7 | 8 | 3 | 5 |
|  | Area priority | 48 | 42 | 14 | 36 |

FIG. 4

|  | A0 | A1 | A2 | A3 |
|---|---|---|---|---|
| Area priority | 48 | 42 | 14 | 36 |
| Area use rank | 1 | 2 | 4 | 3 |

FIG. 5

DISK STORAGE APPARATUS AND METHOD FOR MANAGING STORAGE AREA

CROSS-REFERENCE TO RELATED APPLICATIONS

This application is based upon and claims the benefit of priority from Japanese Patent Application No. 2013-137303, filed Jun. 28, 2013, the entire contents of which are incorporated herein by reference.

FIELD

Embodiments described herein relate generally to a disk storage apparatus and a method for managing a storage area.

BACKGROUND

In recent years, with the expansion of computer networks, there has been an increasing demand for an increase in storage capacity for disk storage apparatuses typified by hard disk drives (HDDs). In particular, in the field of the Internet, for example, attention has been paid to a storage environment called "cold storage". The cold storage environment is an environment in which there is a high probability that data stored in the HDD is left as such, without being accessed. In such a storage environment, it is required to construct such an environment that a large capacity of data is stored with use of a HDD in which more importance is placed on storage capacity than on access performance.

For the construction of the storage environment in which importance is placed on storage capacity, it is necessary to increase the whole storage capacity on the disk in preference to access performance. In conventional HDDs, a storage area on the disk, at which a quality relating to access performance has degraded, is rendered non-usable, and a storage area, at which a high quality can be obtained, is used.

BRIEF DESCRIPTION OF THE DRAWINGS

FIG. 4 is a view illustrating an example of a quality index table according to the embodiment;

FIG. 5 is a view for explaining a method of using the quality index table according to the embodiment;

DETAILED DESCRIPTION

Various embodiments will be described hereinafter with reference to the accompanying drawings.

In general, according to one embodiment, a disk storage apparatus comprises a disk, a storage device, and a controller. The disk comprises a storage area having a plurality of areas. The storage device is configured to store management information including information indicative of a use priority or rank of each of the areas. The information indicative of the use priority or rank being is set based on a quality index relating to a read operation or a write operation. The controller is configured to select an area which is high in the use priority or rank and is usable, by referring to the management information, and to execute the write operation on the selected area.

[Structure of Disk Drive]

Figure 1:
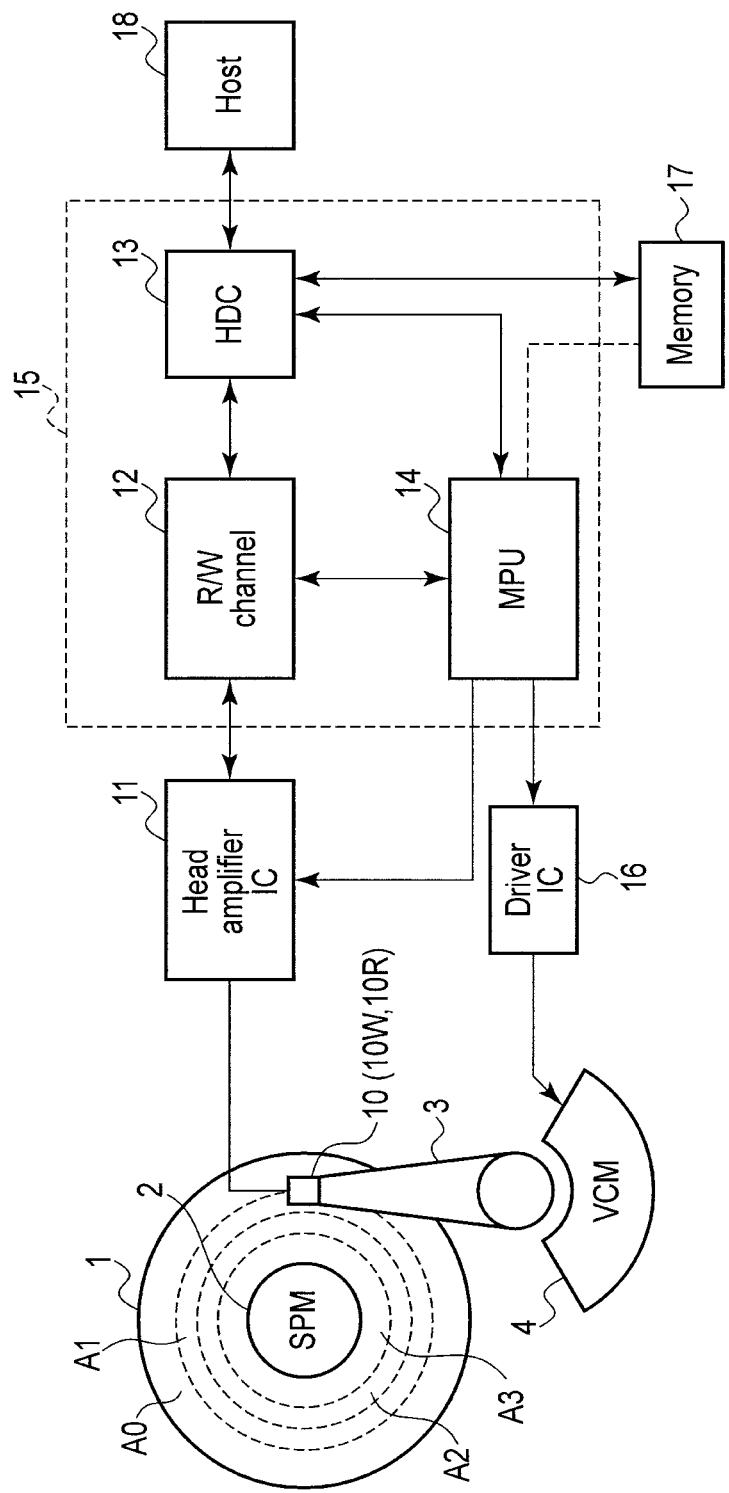
FIG. 1 is a block diagram for illustrating an exemplary structure of a disk drive according to an embodiment.

FIG. 1 is a block diagram illustrating the structure of a hard disk drive (hereinafter simply referred to as "disk drive") as a disk storage apparatus according to an embodiment. As shown in FIG. 1, the disk drive includes a magnetic disk (hereinafter simply referred to as "disk") 1, a spindle motor (SPM) 2 and an actuator 3.

The disk 1 is fixed to the SPM 2, and is attached to be rotatable. A head 10 is mounted on the actuator 3, and is configured to be movable in a radial direction on the disk 1. The actuator 3 is angularly moved by a voice coil motor (VCM) 4. The head 10 includes a write head 10W and a read head 10R.

Further, the disk drive includes a head amplifier integrated circuit (hereinafter referred to as "head amplifier IC") 11, a read/write channel (R/W channel) 12, a hard disk controller (HDC) 13, a microprocessor (MPU) 14, a driver IC 16, and a memory 17. The R/W channel 12, HDC 13 and MPU 14 are incorporated in a controller 15 composed of a one-chip integrated circuit.

The head amplifier IC 11 includes a driver which delivers to the write head 10W a recording signal (write current) corresponding to write data supplied from the R/W channel 12. In addition, the head amplifier IC 11 includes a read amplifier which amplifies a read signal output from the read head 10R, and transfers the amplified read signal to the R/W channel 12. The R/W channel 12 is a signal processing circuit which processes read/write data. The HDC 13 constitutes an interface between the disk drive and a host 18, and executes transfer control of read/write data. The MPU 14 executes control of a read/write operation and servo control necessary for positioning of the magnetic head 10. Normally, the memory 17 is a flash memory. The memory 17 stores a quality index table, as will be described later.

[Manufacturing Process of Disk Drive]

Next, referring to a flowchart of FIG. 2, a description is given of a step of managing the quality of the disk according to the embodiment (hereinafter referred to as "disk quality management step"). The disk quality management step is applied to the disk drive after an assembly step.

To begin with, in the embodiment, as shown in FIG. 1, the storage area on the disk 1 is managed by being divided into a plurality of areas (four areas for convenience sake) A0 to A3 from the outer peripheral side toward the inner peripheral side. Each of the areas is a storage range corresponding to a zone (or a sub-zone) which is, for example, a unit of many tracks.

The controller 15 of the disk drive is connected to the host 18 used in the disk quality management step. As illustrated in FIG. 2, the controller 15 executes a process (quality index value measurement process) for measuring quality index values of each of the areas A0 to A3, based on measurement software and data which are set in the memory 17 from the host 18 (block 200). In the controller 15, the R/W channel 12, HDC 13 and MPU 14 cooperate in executing the quality index value measurement process.

Figures 2, 3:
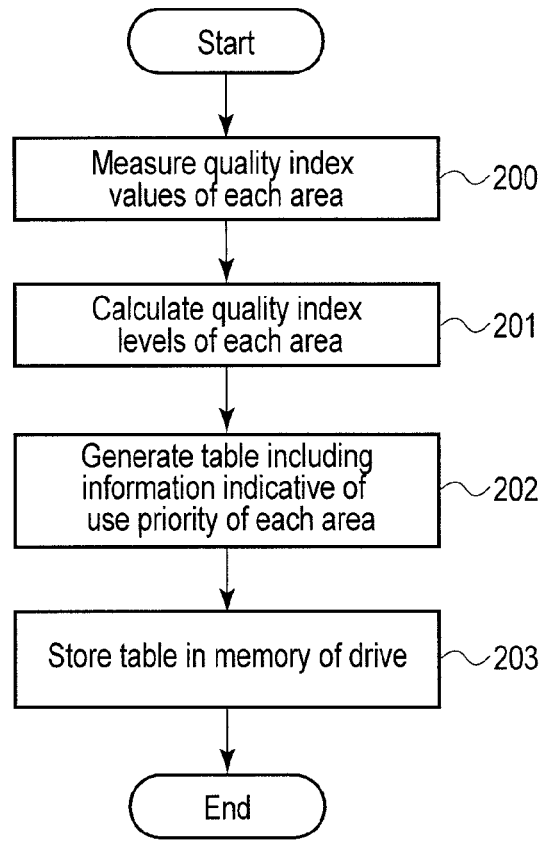
FIG. 2 is a flowchart for illustrating a disk quality management step according to the embodiment.
FIG. 3 is a view illustrating an example of quality indices of each area according to the embodiment.

As shown in FIG. 3, the items of measurement of the quality indices of each of the areas A0 to A3 include quality indices 30 to 34. The quality index 30 is indicative of a difference in output σ between sectors in each area. The quality index 31 is based on, for example, an error rate (e.g. average value) in each area. The quality index 32 is based on, for example a difference in flying (e.g. average value) in each area. The quality index 33 is based on, for example, medium defects (number of defects) in each area. The quality index 34 is based on, for example, a difference in transfer speed (e.g. average value) in each area. These items of measurement are indicative of quality indices which vary due to factors of variances in physical characteristics (e.g. magnetic characteristics) of the disk 1 that is the storage medium.

Specifically, the quality index 30 is indicative of a difference in standard deviation value (σ) of output levels of the read head 10R between sectors in each track in the areas A0 to A3. The quality index 31 is indicative of a difference in read error rate in the read operation. The quality index 32 is indicative of a difference in flying height of the head 10 which flies over the disk 1. The flying height of the head 10 causes variations in output levels of the read head 10R and write head 10W. The quality index 33 is indicative of a difference in number of defects which cause non-usable defective areas (e.g. units of tracks) on the disk 1. The quality index 34 is indicative of a difference in transfer speed of data in the read/write operation.

Referring back to FIG. 2, the controller 15 further calculates (calculation by conversion) quality index levels for determining the priority (area priority) of the areas A0 to A3, based on the quality index values of each of the areas A0 to A3 which have been measured by the measurement process (block 201). The quality index level is a value which conspicuously represents a difference between relative quality index values, for example, by varying weighting factors for the respective measurement items of the quality indices. Specifically, in the case of, for example, the quality index 32 indicative of the difference in flying height, the controller 15 converts the measured quality index value to a quality index level indicative of a degree of a margin for the read operation. In this case, it is indicated that the priority becomes higher as the quality index level indicative of the degree of the margin becomes higher.

As shown in FIG. 4, the controller 15 generates a quality index table indicating, with respect to each of the areas A0 to A3, quality index levels of the quality indices 30 to 34 and including a priority (area priority) 35 indicative of a total (total value) of the quality index levels (block 202). As will be described later, the area priority 35 is indicative of the use priority of each of the areas A0 to A3, which is used as a storage area on the disk 1 when the disk drive executes access (in particular, a write operation). Specifically, it is indicated that an area with a high total value (area A0 in this example) is high in the area priority 35 and is high in the use priority as the storage area.

Next, the controller 15 stores the generated quality index table in the memory (flash memory) 17 (block 203). Incidentally, the controller 15 may store the quality index table, not in the memory 17 but in a system area which is present, for example, on the outer peripheral side on the disk 1. In addition, after the quality index table is stored in the memory 17, the controller 15 may delete from the memory 17 the measurement software and data which are set from the host 18.

[Operation of Disk Drive After Shipment]

After the manufacturing process including the above-described disk quality management step has been completed, the disk drive is shipped as a product. Next, referring to FIG. 5, FIG. 6 and FIG. 7, a description is given of the case in which the disk drive according to the embodiment executes a write operation as the product.

To begin with, by the above-described disk quality management step, the quality index table is stored in the memory (flash memory) 17 of the disk drive. In the embodiment in which the quality index table shown in FIG. 4 is used, an area use rank 36, as shown in FIG. 5, is set for each of the areas A0 to A3 on the disk 1, based on the area priority (use priority) 35 indicated by the total value of quality index levels, for convenience sake. The information shown in FIG. 5 is referred to as "priority order table" for convenience sake. The priority order table is included in the quality index table.

Upon receiving a write command sent from the host 18, the controller 15 executes a write operation of writing data to the disk 1. Before executing this write operation, the MPU 14 refers to the quality index table and priority order table (see FIG. 4, FIG. 5) which are stored in the memory 14 (block 600). Based on the quality index table and priority order table which are referred to, the MPU 14 selects usable areas in an order beginning with an area which is highest in the area priority 35 (block 601). In other words, as shown in FIG. 5, the MPU 14 selects areas in descending order of the area use rank 36. When an area (e.g. area A0), which is relatively high in the area use rank 36, has no free space, the MPU 14 selects a usable area from among the usable areas A1 to A3 excluding the area A0. The MPU 14 may set in the memory 17 a flag which can identify an area with no free space.

Figures 6, 7:
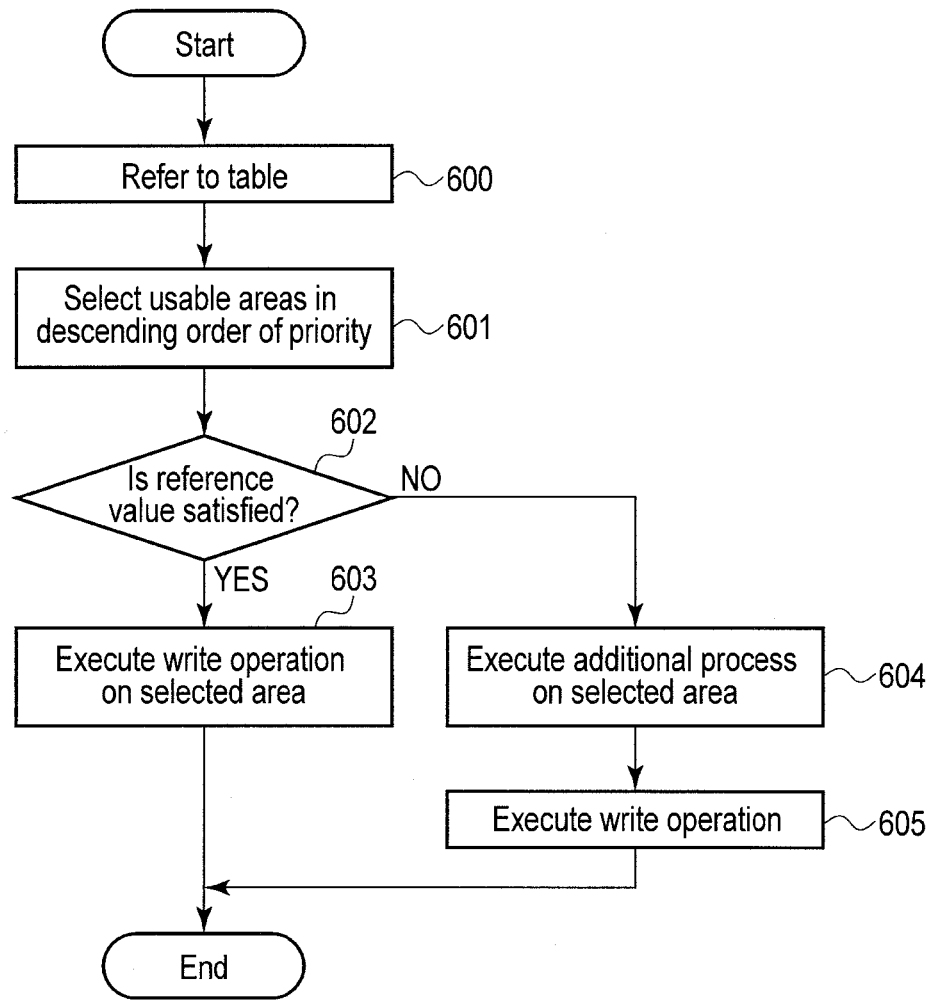
FIG. 6 is a flowchart for illustrating a write operation of the disk drive according to the embodiment.
FIG. 7 is a view for explaining another method of using the quality index table according to the embodiment.

Next, the MPU 14 determines whether the value of the area priority 35 of the selected area satisfies a reference value or not (block 602). As shown in FIG. 7, this reference value corresponds to a threshold (e.g. 20) of the total value of quality index levels, and is set in advance. In the example of FIG. 7, it is indicated that the normal use of the areas A0, A1 and A3, whose total values satisfy the reference value (20 in this example), is permitted. On the other hand, it is indicated that the area A2, whose total value is less than the reference value, has a low quality index level and the normal use of this area A2 is inhibited. The "normal use", in this context, means that the area is usable as an access target (write target), without the need to execute an additional process for enhancing reliability, as will be described later.

Specifically, as shown in FIG. 3, as regards the quality indices of the area A2, for example, the quality index level of the quality index 32, which is indicative of the difference in flying height is considerably low, and this indicates that there is no allowance for the margin relating to the read operation. This quality index 32 also relates to the quality index 31 which is indicative of the difference in read error rate. In other words, it is suggested that in the read operation of reading data written to the area A2, the error rate is high and the probability of occurrence of a read error is high.

When the value of the use priority 35 of the selected area satisfies the reference value, the MPU 14 determines the selected area (e.g. area A1) to be an access target (write target) (YES in block 602). The controller 15 performs control to execute a write operation of writing data to the area A1 which has been determined to be the write target (block 603).

On the other hand, it is assumed that, despite the areas A0, A1 and A3 with high ranks in the use rank 36 having been selected, for example, these selected areas A0, A1 and A3 have no free space. In this case, the MPU 14 selects the area A2. When the MPU 14 selects the area A2, the MPU 14 confirms that the value of the use priority 35 of the area A2 is less than the reference value (NO in block 602). In this case, although the normal use of the area A2 is inhibited, the MPU 14 determines the area A2 to be the write target (block 604). In block 604, the MPU 14 performs control to execute an additional process, prior to executing a normal write operation of writing data to the area A2 which has been determined to be the write target.

The additional process is, for instance, a write verify process, a parity data addition process, or a process (format change process) of changing the format of the area A2. The write verify process corresponds to a first process of writing data to a designated track of the area A2 and reading this data to check the occurrence of a read error. In this case, when a read error cannot be eliminated, a defect process of allocating a substitute track for the designated track is performed. The parity data addition process corresponds to a second process of adding parity data, which is other than ordinary error correction code (ECC) data, to the write data. Further, the format change process corresponds to a third process of changing the format of the area A2 and relaxing a linear recording density (BPI: bits per inch) or a track density (TPI: tracks per inch). In the embodiment, the MPU 14 executes a set of these additional processes. In the meantime, these additional processes may be individually executed, or some of these may be executed in combination.

After the additional process, the controller 15 performs control to execute the write operation of writing data to the area A2 that has been determined to be the write target (block 605). Specifically, the controller 15 executes the write operation after enhancing the reliability by executing the additional process in advance on the area A2 whose total value of quality index levels is low.

When the MPU 14 determines whether the value of use priority (the total value of quality index levels) of the selected area A2 satisfies the reference value, the MPU 14 may use first and second reference values as the reference value. The first reference value is a criterion which means a threshold of usability on the presupposition of the above-described additional process. The second reference value is a criterion of non-usability without condition. Specifically, the first reference value is 20, for example, and the second reference value is 10. When the total value of the selected area A2 is less than the second reference value (10), the MPU 14 may treat the area A2 as being non-usable.

As has been described above, according to the present embodiment, the process of measuring quality indices and the process of generating the quality index table are executed in the disk quality management step included in the manufacturing process of the disk drive. Specifically, according to the embodiment, the quality index table indicative of the quality indices, which have been measured with respect to each of areas obtained by dividing the storage area on the disk 1, is generated, and this quality index table is stored in the memory (flash memory) 17 in the disk drive. When the disk drive operates as a product, the disk drive refers to the quality index table, thereby being able to select areas in descending order of use priority and to execute the write operation.

In conventional disk drives, basically, data is sequentially written to areas on the disk from the outer peripheral side to inner peripheral side of the disk. By contrast, in the embodiment, data is always preferentially written to areas having high use priority. Therefore, according to the embodiment, since the probability is low that data is written to areas with relatively low use priority, high reliability for data storage can be secured.

Furthermore, according to the embodiment, of the areas with low use priority, even an area, whose quality indices (the total value of quality index levels) fail to meet the reference value, is used as a storage area on the condition that the additional process is executed. In the conventional disk drive, an area (zone) with low reliability, whose quality indices fail to meet the reference value, is rendered non-usable as a storage area (defect registration). By contrast, in the embodiment, if an area can ensure minimum reliability on the condition of execution of the additional process, this area is used as a storage area. Therefore, since the storage area of the disk 1 can be used to the maximum, an increase in storage capacity can be achieved as a result, and a large storage capacity can be secured.

With the disk drive of the embodiment, it is possible to realize the construction of a storage environment in which higher priority is placed on the securement of a large storage capacity than on the access performance. Specifically, since a cold storage environment, for instance, can be realized, this disk drive can advantageously be implemented as a storage for a server in a data center, etc., where importance is placed on the increase in storage capacity.

In the embodiment, the case is presupposed that the disk drive includes such a structure as to select areas in descending order of use priority, by referring to the generated quality index table. However, the disk drive may include such a structure as to select areas, based on management information that is not of a table format. For example, use may be made of management information in which only use priority is set for each area, and which includes flags indicative of areas that require additional processes or areas that are non-usable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
   a disk comprising a storage area having a plurality of areas;
   a storage device configured to store management information including information indicative of a use priority or rank of each of the areas, the information indicative of the use priority or rank being set based on a quality index relating to a read operation or a write operation; and
   a controller configured to select an area which is high in the use priority or rank and is usable, by referring to the management information, and to execute the write operation on the selected area.

2. The disk storage apparatus of claim 1, wherein the controller is further configured to:
   select areas in descending order in the use priority or rank;
   determine, based on the management information, whether normal use of each of the selected areas as a storage area is permitted; and
   execute an additional process for enhancing reliability of a corresponding area and execute the write operation when the normal use of the corresponding area is inhibited.

3. The disk storage apparatus of claim 2, wherein the management information is generated in a manufacturing process of the disk storage apparatus, and is stored in the storage device.

4. The disk storage apparatus of claim 2, wherein the controller is further configured to select an area comprising a free storage area as the usable area.

5. The disk storage apparatus of claim 2, wherein the controller is further configured to execute, as the additional process, any of a first process, a second process and a third process, the first process comprising a write verify process, the second process comprising a process of adding parity data to write data, and the third process comprising a process of relaxing a recording density of the corresponding area.

6. The disk storage apparatus of claim 5, wherein the controller is further configured to execute, as the additional process, all of the first process, the second process and the third process.

7. The disk storage apparatus of claim 5, wherein the management information comprises a total value of quality index levels corresponding to a plurality of quality index items with respect to each of the areas, and comprises information indicating that the use priority or rank becomes higher as the total value becomes higher.

8. The disk storage apparatus of claim 2, wherein the management information comprises a total value of quality index levels corresponding to a plurality of quality index items with respect to each of the areas, and comprises information indicating that the use priority or rank becomes higher as the total value becomes higher.

9. The disk storage apparatus of claim 1, wherein the management information is generated in a manufacturing process of the disk storage apparatus, and is stored in the storage device.

10. The disk storage apparatus of claim 1, wherein the controller is further configured to select an area comprising a free storage area as the usable area.

11. The disk storage apparatus of claim 1, wherein the management information comprises a total value of quality index levels corresponding to a plurality of quality index items with respect to each of the areas, and comprises information indicating that the use priority or rank becomes higher as the total value becomes higher.

12. The disk storage apparatus of claim 11, wherein the controller is further configured to:
    determine whether the normal use of each of the areas as the storage area is permitted, based on a comparison between the total value and a reference value;
    select corresponding areas in an order beginning with an area which is highest in the use priority or rank when the normal use of the corresponding areas is permitted; and
    execute an additional process for enhancing reliability of a corresponding area and execute the write operation when the normal use of the corresponding area is inhibited.

13. The disk storage apparatus of claim 1, wherein the controller is further configured to:
    determine, based on the management information, whether each of the areas is non-usable as a storage area without condition; and
    exclude a corresponding area from an access target when the corresponding area is non-usable without condition.

14. A method, implemented in a disk storage apparatus comprising a disk and a storage device, for managing a storage area, the disk comprising the storage area having a plurality of areas, the storage device being configured to store management information including information indicative of a use priority or rank of each of the areas, the information indicative of the use priority or rank being set based on a quality index relating to a read operation or a write operation, the method comprising:
    referring to the management information;
    selecting an area which is high in the use priority or rank and is usable; and
    executing the write operation on the selected area.

15. The method of claim 14, further comprising:
    selecting areas in descending order in the use priority or rank;
    determining, based on the management information, whether normal use of each of the selected areas as a storage area is permitted;
    executing an additional process for enhancing reliability of a corresponding area when the normal use of the corresponding area is inhibited; and
    executing the write operation after the additional process.

16. The method of claim 15, wherein said executing the additional process comprises executing any of a first process, a second process and a third process, the first process comprising a write verify process, the second process comprising a process of adding parity data to write data, and the third process comprising a process of relaxing a recording density of the corresponding area.

17. The method of claim 14, further comprising selecting an area comprising a free storage area as the usable area.

18. The method of claim 14, wherein the management information comprises a total value of quality index levels corresponding to a plurality of quality index items with respect to each of the areas, and comprises information indicating that the use priority or rank becomes higher as the total value becomes higher.

19. The method of claim 18, further comprising:
    determining whether the normal use of each of the areas as the storage area is permitted, based on a comparison between the total value and a reference value;
    selecting corresponding areas in an order beginning with an area which is highest in the use priority or rank when the normal use of the corresponding areas is permitted;
    executing an additional process for enhancing reliability of a corresponding area when the normal use of the corresponding area is inhibited; and
    executing the write operation after the additional process.

20. The method of claim 14, further comprising:
    determining, based on the management information, whether each of the areas is non-usable as a storage area without condition; and
    excluding a corresponding area from an access target when the corresponding area is non-usable without condition.

* * * * *